(12) United States Patent
Sun et al.

(10) Patent No.: US 12,218,880 B2
(45) Date of Patent: Feb. 4, 2025

(54) TRANSMITTING FEEDBACK FOR SIDELINK TRANSMISSIONS

(71) Applicant: LENOVO (BEIJING) LIMITED, Beijing (CN)

(72) Inventors: Zhennian Sun, Beijing (CN); Xiaodong Yu, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 350 days.

(21) Appl. No.: 17/767,316

(22) PCT Filed: Oct. 7, 2019

(86) PCT No.: PCT/CN2019/109845
§ 371 (c)(1),
(2) Date: Apr. 7, 2022

(87) PCT Pub. No.: WO2021/068095
PCT Pub. Date: Apr. 15, 2021

(65) Prior Publication Data
US 2022/0368503 A1     Nov. 17, 2022

(51) Int. Cl.
*H04L 5/00* (2006.01)
*H04L 1/1812* (2023.01)

(52) U.S. Cl.
CPC .......... *H04L 5/0055* (2013.01); *H04L 1/1812* (2013.01)

(58) Field of Classification Search
CPC ... H04L 5/0055; H04L 1/1812; H04L 1/1864; H04L 1/1887; H04L 2001/0093; H04L 1/1854
See application file for complete search history.

(56) References Cited

U.S. PATENT DOCUMENTS

| | | |
|---|---|---|
| 2018/0035427 A1 | 2/2018 | Gupta et al. |
| 2023/0292319 A1* | 9/2023 | Hwang ................. H04L 1/1854 |

FOREIGN PATENT DOCUMENTS

| | | |
|---|---|---|
| WO | 2017084514 A1 | 5/2017 |
| WO | 2019029652 A1 | 2/2019 |

OTHER PUBLICATIONS

International Searching Authority, "Written Opinion of the International Searching Authority," PCT/CN2019/109845, Jul. 2, 2020, pp. 1-4.

(Continued)

*Primary Examiner* — Eric Myers
(74) *Attorney, Agent, or Firm* — Kunzler Bean & Adamson

(57) ABSTRACT

Apparatuses, methods, and systems are disclosed for transmitting and/or receiving feedback for sidelink transmissions. One method (1000) includes receiving (1002) information from a network device indicating multiple resources for sidelink transmission and resources for feedback. The method (1000) includes transmitting (1004) sidelink data using the multiple resources for sidelink transmission. The method (1000) includes transmitting (1006) feedback to the network device using the resources for feedback based on the transmission of the sidelink data, wherein transmitting the feedback includes: transmitting only a negative acknowledgment on a first at least one resource of the resources for feedback in response to sidelink feedback not being used for the transmission of the sidelink data; transmitting only a positive acknowledgment or no acknowledgment on a second at least one resource of the resources for feedback in response to the sidelink feedback being used for the transmission of the sidelink data; or a combination thereof.

20 Claims, 8 Drawing Sheets

(56) References Cited

OTHER PUBLICATIONS

Ericsson, Feature lead summary#2 on Resource allocation for NR sidelink Mode 1, 3GPP TSG-RAN WG1 Meeting #98, R1-1909797, Aug. 26-30, 2019, pp. 1-34, Prague, CZ.
Lenovo, Motorola Mobility, Discussion on resource allocation for NR sidelink Mode 1, 3GPP TSG RAN WG1 #98bis, R1-1910145, Oct. 14-20, 2019, pp. 1-8, Chongqing, China.
TCL Communication, Resource allocation for NR sidelink Mode 1, 3GPP TSG RAN WG1 Meeting #98b, R1-1910410, Oct. 14-20, 2019, pp. 1-11, Chongqing, China.
Huawei, Hisilicon, Discussion on HARQ support for NR sidelink, 3GPP TSG-RAN WG2 # 104, R2-1818198, Nov. 2, 2018, pp. 1-4, Spokane, USA.
Huawei, Hisilicon, Discussion on HARQ support for NR sidelink, 3GPP TSG-RAN WG2 #107bis, R2-1913701, Oct. 14-18, 2019, pp. 1-17, Chongqing, China.

* cited by examiner

TRANSMITTING FEEDBACK FOR SIDELINK TRANSMISSIONS

FIELD

The subject matter disclosed herein relates generally to wireless communications and more particularly relates to transmitting feedback for sidelink transmissions.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Component Carrier ("CC"), Code Division Multiplexing ("CDM"), Control Element ("CE"), Coordinated Multipoint ("CoMP"), Categories of Requirements ("CoR"), Control Resource Set ("CORESET"), Cyclic Prefix ("CP"), Cyclic Prefix OFDM ("CP-OFDM"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink ("DL"), Discrete Fourier Transform Spread OFDM ("DFT-s-OFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), High-Definition Multimedia Interface ("HDMI"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), L1 RSRP ("L1-RSRP"), L1 SINR ("L1-SINR"), Logical Channel ("LCH"), Logical Channel Group ("LCG"), Logical Channel ID ("LCID"), Logical Channel Prioritization ("LCP"), Layer Indicator ("LI"), Long Term Evolution ("LTE"), Levels of Automation ("LoA"), Medium Access Control ("MAC"), Modulation Coding Scheme ("MCS"), Multi DCI ("M-DCI"), Master Information Block ("MIB"), Multiple Input Multiple Output ("MIMO"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Minimum Mean Square Error ("MMSE"), Negative-Acknowledgment ("NACK") or ("NAK"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Control Channel ("PUCCH"), Physical Uplink Shared Channel ("PDSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Reference Signal ("RS"), Reference Signal Received Power ("RSRP"), Reference Signal Received Quality ("RSRQ"), Receive ("RX"), Single Carrier Frequency Domain Spread Spectrum ("SC-FDSS"), Secondary Cell ("SCell"), Sub Carrier Spacing ("SCS"), Single DCI ("S-DCI"), Service Data Unit ("SDU"), Subscriber Identity Module ("SIM"), Signal-to-Interference Ratio ("SINR"), Sidelink ("SL"), Sequence Number ("SN"), Scheduling Request ("SR"), SRS Resource Indicator ("SRI"), Sounding Reference Signal ("SRS"), Synchronization Signal ("SS"), SS/PBCH Block ("SSB"), Transport Block ("TB"), Transmission Configuration Indicator ("TCI"), Time Division Duplex ("TDD"), Temporary Mobile Subscriber Identity ("TMSI"), Transmitted Precoding Matrix Indicator ("TPMI"), Transmission Reception Point ("TRP"), Technical Standard ("TS"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), LTE Radio Interface ("Uu interface"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, HARQ-ACK may be used. In such networks, more resources may be allocated than are used.

BRIEF SUMMARY

Methods for transmitting feedback for sidelink transmissions are disclosed. Apparatuses and systems also perform the functions of the methods. In one embodiment, the method includes receiving information from a network device indicating a plurality of resources for sidelink transmission and one or more resources for feedback. In certain embodiments, the method includes transmitting sidelink data using the plurality of resources for sidelink transmission. In various embodiments, the method includes transmitting feedback to the network device using the one or more resources for feedback based on the transmission of the sidelink data, wherein transmitting the feedback comprises: transmitting only a negative acknowledgment on a first at least one resource of the one or more resources for feedback in response to sidelink feedback not being used for the transmission of the sidelink data; transmitting only a positive acknowledgment or no acknowledgment on a second at least one resource of the one or more resources for feedback in response to the sidelink feedback being used for the transmission of the sidelink data; or a combination thereof.

An apparatus for transmitting feedback for sidelink transmissions, in one embodiment, includes a receiver that receives information from a network device indicating a plurality of resources for sidelink transmission and one or more resources for feedback. In various embodiments, the apparatus includes a transmitter that: transmits sidelink data using the plurality of resources for sidelink transmission; and transmits feedback to the network device using the one or more resources for feedback based on the transmission of the sidelink data, wherein transmitting the feedback comprises: transmitting only a negative acknowledgment on a first at least one resource of the one or more resources for feedback in response to sidelink feedback not being used for the transmission of the sidelink data; transmitting only a positive acknowledgment or no acknowledgment on a second at least one resource of the one or more resources for feedback in response to the sidelink feedback being used for the transmission of the sidelink data; or a combination thereof.

In one embodiment, a method for receiving feedback for sidelink transmissions includes transmitting information from a network device indicating a plurality of resources for sidelink transmission and one or more resources for feedback. In certain embodiments, the method includes receiving feedback at the network device using the one or more resources for feedback, wherein receiving the feedback comprises: receiving only a negative acknowledgment on a first at least one resource of the one or more resources for feedback in response to sidelink feedback not being used for the sidelink transmission; receiving only a positive acknowledgment or no acknowledgment on a second at least one resource of the one or more resources for feedback in response to the sidelink feedback being used for the sidelink transmission; or a combination thereof.

An apparatus for receiving feedback for sidelink transmissions, in one embodiment, includes a transmitter that transmits information from the apparatus indicating a plurality of resources for sidelink transmission and one or more resources for feedback. In some embodiments, the apparatus includes a receiver that receives feedback at the apparatus using the one or more resources for feedback, wherein receiving the feedback comprises: receiving only a negative acknowledgment on a first at least one resource of the one or more resources for feedback in response to sidelink feedback not being used for the sidelink transmission; receiving only a positive acknowledgment or no acknowledgment on a second at least one resource of the one or more resources for feedback in response to the sidelink feedback being used for the sidelink transmission; or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
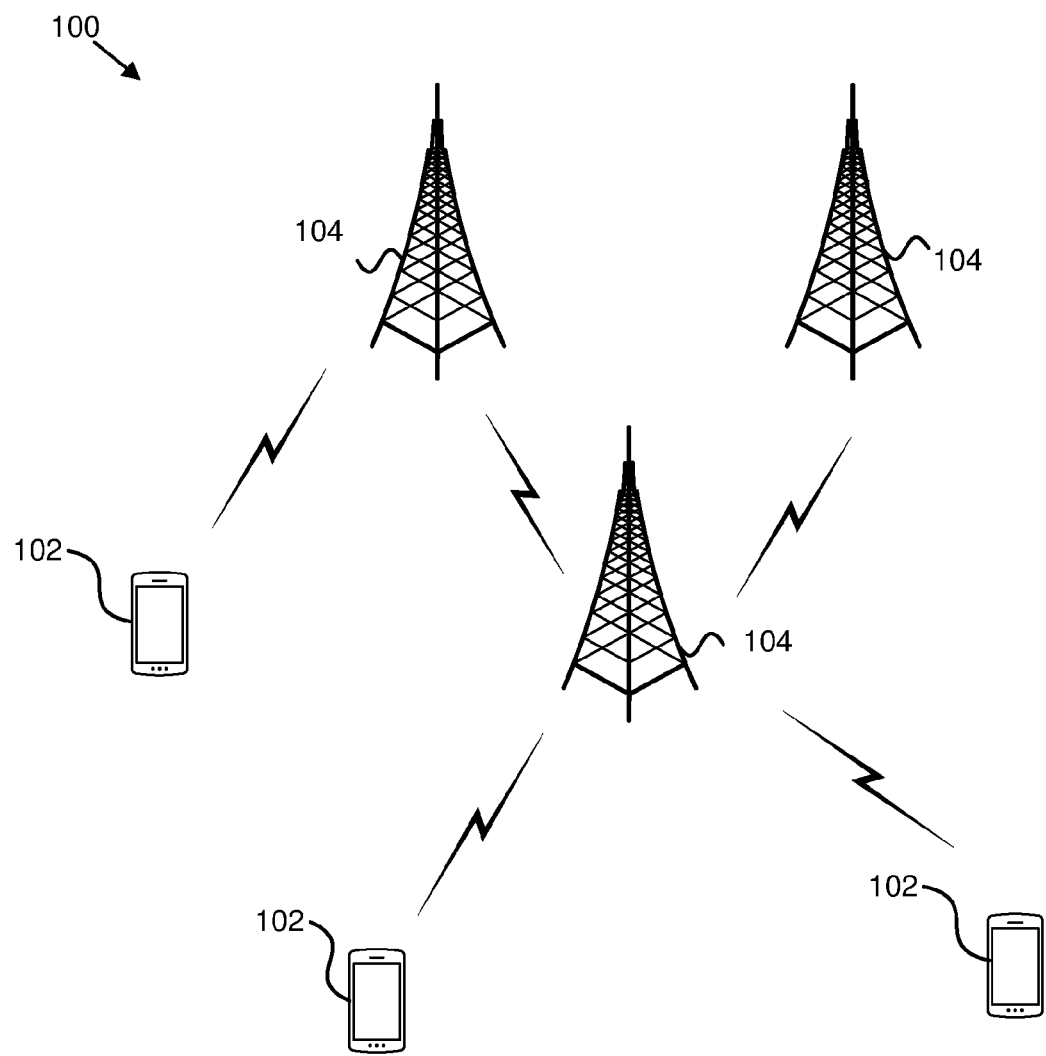
FIG. 1 is a schematic block diagram illustrating one embodiment of a wireless communication system for transmitting and/or receiving feedback for sidelink transmissions.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving feedback for sidelink transmissions. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive information from a network device (e.g., network unit 104) indicating a plurality of resources for sidelink transmission and one or more resources for feedback. In certain embodiments, the remote unit 102 may transmit sidelink data using the plurality of resources for sidelink transmission. In various embodiments, the remote unit 102 may transmit feedback to the network device using the one or more resources for feedback based on the transmission of the sidelink data, wherein transmitting the feedback comprises: transmitting only a negative acknowledgment on a first at least one resource of the one or more resources for feedback in response to sidelink feedback not being used for the transmission of the sidelink data; transmitting only a positive acknowledgment or no acknowledgment on a second at least one resource of the one or more resources for feedback in response to the sidelink feedback being used for the transmission of the sidelink data; or a combination thereof. Accordingly, a remote unit 102 may be used for transmitting feedback for sidelink transmissions.

In some embodiments, a network unit 104 may receive feedback for sidelink transmissions includes transmitting information from a network device (e.g., the network unit 104) indicating a plurality of resources for sidelink transmission and one or more resources for feedback. In certain embodiments, the network unit 104 may receive feedback at the network device using the one or more resources for feedback, wherein receiving the feedback comprises: receiving only a negative acknowledgment on a first at least one resource of the one or more resources for feedback in response to sidelink feedback not being used for the sidelink transmission; receiving only a positive acknowledgment or no acknowledgment on a second at least one resource of the one or more resources for feedback in response to the sidelink feedback being used for the sidelink transmission; or a combination thereof. Accordingly, a network unit 104 may be used for receiving feedback for sidelink transmissions.

Figure 2:
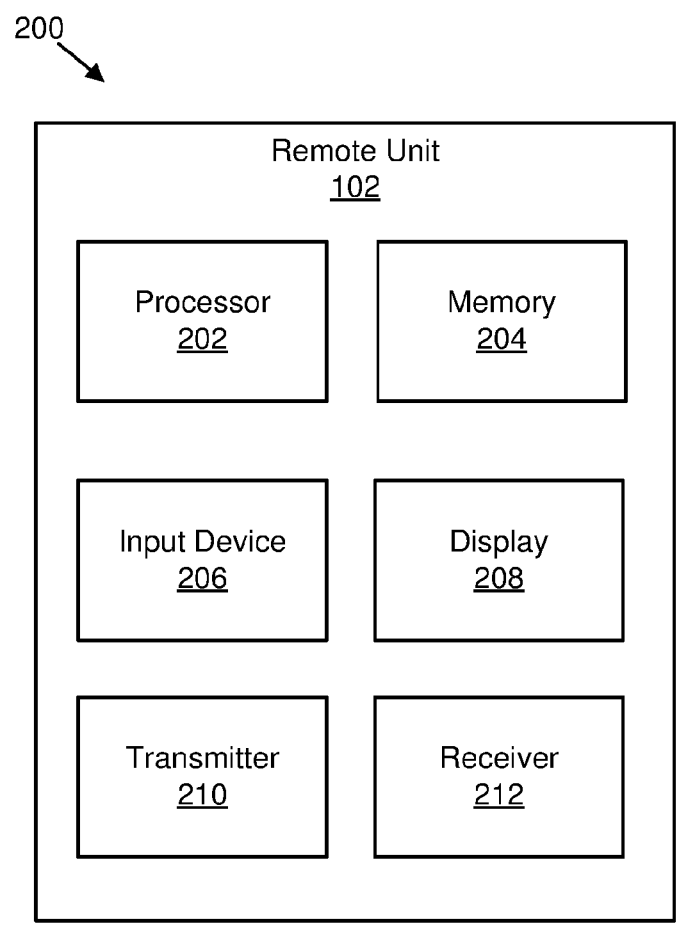
FIG. 2 is a schematic block diagram illustrating one embodiment of an apparatus that may be used for transmitting feedback for sidelink transmissions.

FIG. 2 depicts one embodiment of an apparatus 200 that may be used for transmitting feedback for sidelink transmissions. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations.

For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In various embodiments, the receiver 212 receives information from a network device (e.g., the network unit 104) indicating a plurality of resources for sidelink transmission and one or more resources for feedback. In some embodiments, the transmitter 210: transmits sidelink data using the plurality of resources for sidelink transmission; and transmits feedback to the network device using the one or more resources for feedback based on the transmission of the sidelink data, wherein transmitting the feedback comprises: transmitting only a negative acknowledgment on a first at least one resource of the one or more resources for feedback in response to sidelink feedback not being used for the transmission of the sidelink data; transmitting only a positive acknowledgment or no acknowledgment on a second at least one resource of the one or more resources for feedback in response to the sidelink feedback being used for the transmission of the sidelink data; or a combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
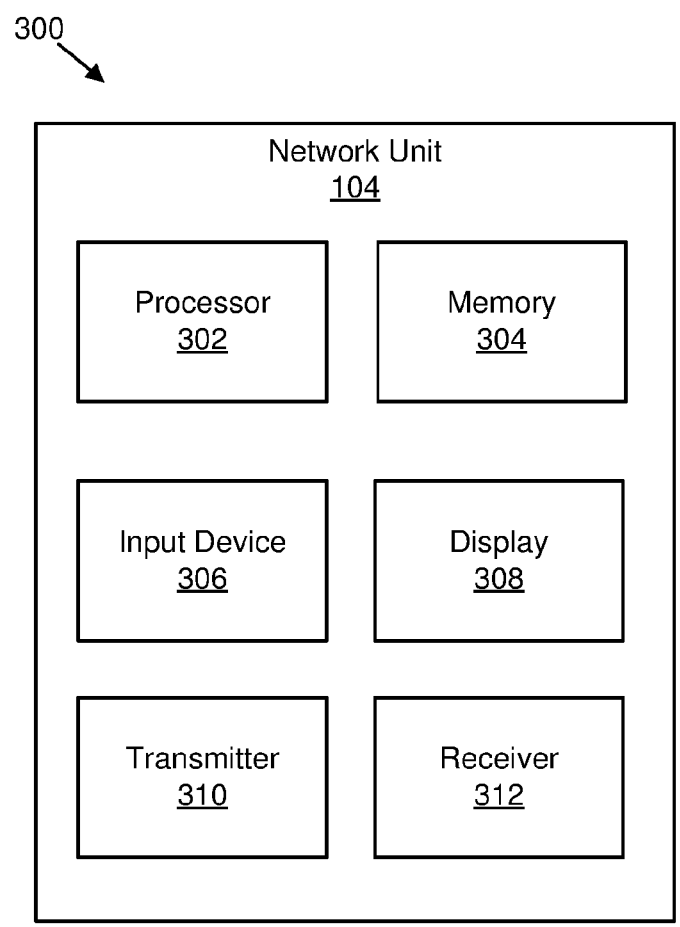
FIG. 3 is a schematic block diagram illustrating one embodiment of an apparatus that may be used for receiving feedback for sidelink transmissions.

FIG. 3 depicts one embodiment of an apparatus 300 that may be used for receiving feedback for sidelink transmissions. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 transmits information from the apparatus 300 indicating a plurality of resources for sidelink transmission and one or more resources for feedback. In various embodiments, the receiver 312 receives feedback at the apparatus using the one or more resources for feedback, wherein receiving the feedback comprises: receiving only a negative acknowledgment on a first at least one resource of the one or more resources for feedback in response to sidelink feedback not being used for the sidelink transmission; receiving only a positive acknowledgment or no acknowledgment on a second at least one resource of the one or more resources for feedback in response to the sidelink feedback being used for the sidelink transmission; or a combination thereof. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In a first embodiment, a TX UE selects a TB and performs sidelink transmissions on allocated resources.

In a first step of the first embodiment, a gNB transmits DCI (e.g., including a sidelink grant) to a TX UE. The DCI allocates one or more resources (e.g., one or more PSSCH resources) for sidelink transmission of a TB from the TX UE, and the DCI allocates one or more resources (e.g., one or more PUCCH resources) for a SL HARQ report to be transmitted to the gNB from the TX UE over a Uu interface. As may be appreciated, the PUCCH resource is for ACK/NACK feedback transmitted from the TX UE to the gNB.

In a second step of the first embodiment, the TX UE selects the TB and performs a sidelink transmission on the allocated one or more resources (e.g., one or more PSSCH resources). The TX UE may select the TB to be transmitted using broadcast, unicast, or groupcast (e.g., multicast). As used herein, broadcast may refer to a transmission from one source to all possible destinations (e.g., one-to-all), unicast may refer to a transmission from one source to one destination (e.g., one-to-one), and groupcast (e.g., or multicast) may refer to a transmission from one source to multiple destinations (e.g., multiple selected or grouped destinations, one-to-many).

If the TB is transmitted using broadcast, then there will be no SL HARQ feedback transmitted from SL devices to the TX UE. However, if the TB is unicast or groupcast, the TX UE may decide if the SL HARQ feedback transmitted from SL devices to the TX UE is enabled or disabled.

If the SL HARQ feedback transmitted from SL devices to the TX UE is disabled by TX UE or the TB is broadcast (e.g., there will be no SL HARQ feedback transmitted from SL devices to the TX UE), then: 1) on all configured PUCCH resources except the last configured PUCCH resource, the TX UE transmits NACK to the gNB to avoid the gNB releasing the allocated one or more resources (e.g., one or more PSSCH resources and/or one or more PUCCH resources); and 2) on the last configured PUCCH resource, the TX UE transmits ACK to the gNB.

In a third step of the first embodiment, the gNB detects the SL HARQ feedback on the allocated one or more resources (e.g., one or more PUCCH resources) transmitted from the TX UE. If ACK is received on a PUCCH resource before the last PUCCH resource, the gNB may reallocate remaining resources (e.g., PSSCH resources, PUCCH resources) for other purposes. If NACK is received on a PUCCH resource before the last PUCCH resource, then no action may be performed by the gNB in relation to the remaining resources. If the gNB doesn't detect ACK or NACK on the first PUCCH resource, the gNB may assume that the TX UE hasn't received the DCI (e.g., including the sidelink grant) and the gNB may reallocate the remaining resources (e.g., PSSCH resources, PUCCH resources) for other purposes. If ACK is received on the last PUCCH resource, the gNB assumes that the SL transmissions are successful. If NACK is received on the last PUCCH resource, the gNB assumes the SL transmissions are unsuccessful. If the gNB doesn't detect ACK or NACK on the last PUCCH resource, the gNB assumes that the TX UE hasn't received the DCI (e.g., including the sidelink grant).

Figure 4:
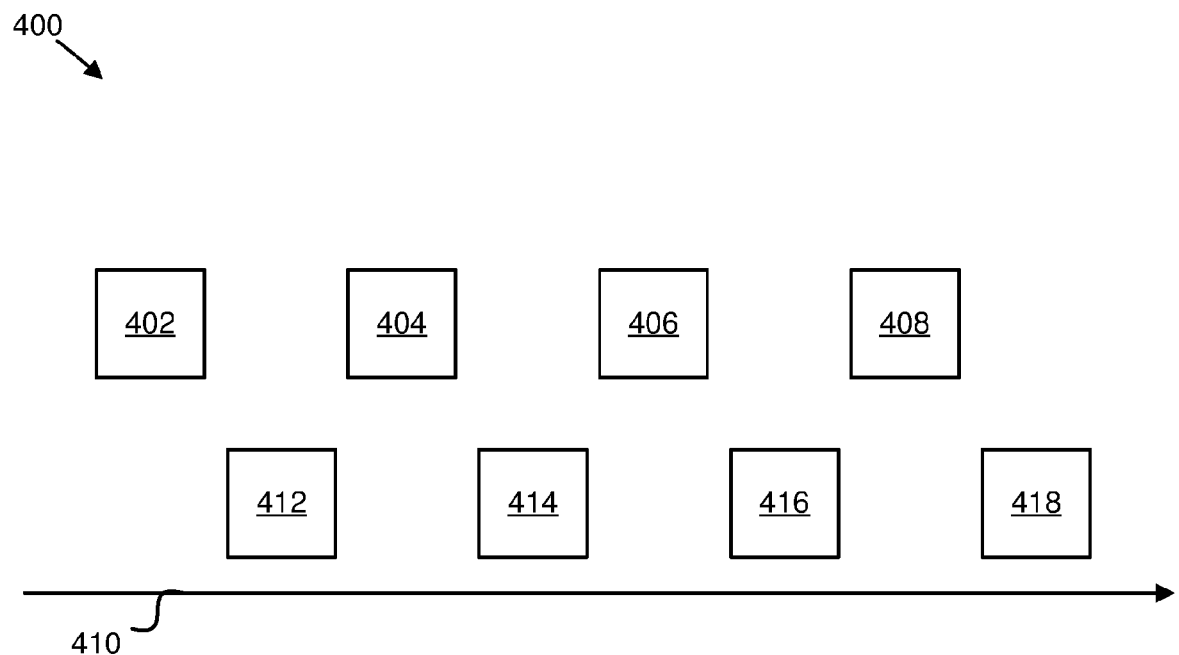
FIG. 4 is a schematic block diagram illustrating one embodiment of a TX UE's transmissions.
Figure 5:
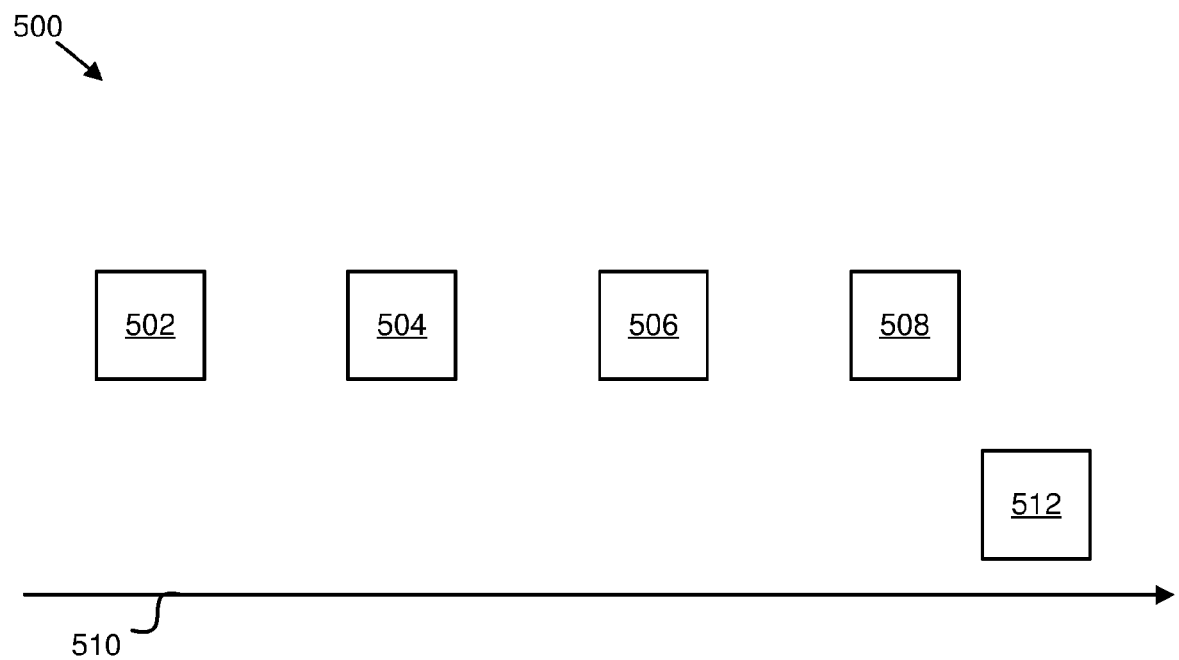
FIG. 5 is a schematic block diagram illustrating another embodiment of a TX UE's transmissions.
Figure 6:
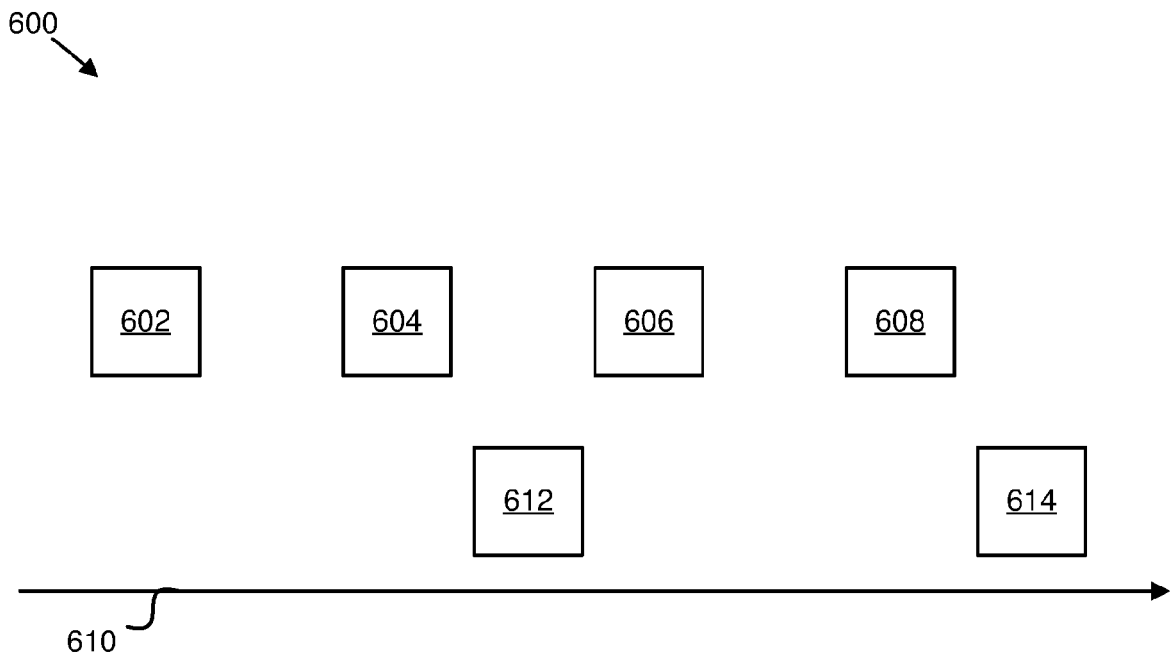
FIG. 6 is a schematic block diagram illustrating a further embodiment of a TX UE's transmissions.

FIGS. 4 through 6 illustrate examples of a TX UE's transmissions if the TX UE determines that there is no SL HARQ feedback to be received from SL devices, but DCI allocates PUCCH resources for transmission of SL HARQ feedback from the TX UE to the gNB.

FIG. 4 is a schematic block diagram illustrating one embodiment of a TX UE's transmissions 400. The TX UE's transmissions 400 include a first SL transmission 402 on a first PSSCH resource, a second SL transmission 404 on a second PSSCH resource, a third SL transmission 406 on a third PSSCH resource, and a fourth SL transmission 408 on a fourth PSSCH resource. All of the illustrated TX UE's transmissions 400 occur over a time period 410. The TX UE's transmissions 400 also include a first feedback transmission 412 on a first PUCCH resource, a second feedback transmission 414 on a second PUCCH resource, a third feedback transmission 416 on a third PUCCH resource, and a fourth feedback transmission 418 on a fourth PUCCH resource.

As described in the first embodiment, if SL HARQ feedback is not enabled or used (e.g., the TX UE does not receive SL HARQ feedback from SL devices), in the embodiment illustrated in FIG. 4, the TX UE will transmit NACK in the first feedback transmission 412, the second feedback transmission 414, and the third feedback transmission 416. In the fourth feedback transmission 418, the TX UE will transmit ACK.

FIG. 5 is a schematic block diagram illustrating another embodiment of a TX UE's transmissions 500. The TX UE's transmissions 500 include a first SL transmission 502 on a first PSSCH resource, a second SL transmission 504 on a second PSSCH resource, a third SL transmission 506 on a third PSSCH resource, and a fourth SL transmission 508 on a fourth PSSCH resource. All of the illustrated TX UE's transmissions 500 occur over a time period 510. The TX UE's transmissions 500 also include a first feedback transmission 512 on a first PUCCH resource.

As described in the first embodiment, if SL HARQ feedback is not enabled or used (e.g., the TX UE does not receive SL HARQ feedback from SL devices), in the embodiment illustrated in FIG. 5, the TX UE will transmit ACK in the first feedback transmission 512.

FIG. 6 is a schematic block diagram illustrating a further embodiment of a TX UE's transmissions 600. The TX UE's transmissions 600 include a first SL transmission 602 on a first PSSCH resource, a second SL transmission 604 on a second PSSCH resource, a third SL transmission 606 on a third PSSCH resource, and a fourth SL transmission 608 on a fourth PSSCH resource. All of the illustrated TX UE's transmissions 600 occur over a time period 610. The TX UE's transmissions 600 also include a first feedback transmission 612 on a first PUCCH resource and a second feedback transmission 614 on a second PUCCH resource.

As described in the first embodiment, if SL HARQ feedback is not enabled or used (e.g., the TX UE does not receive SL HARQ feedback from SL devices), in the embodiment illustrated in FIG. 6, the TX UE will transmit NACK in the first feedback transmission 612. In the second feedback transmission 614, the TX UE will transmit ACK.

In a second embodiment, a TX UE selects a TB (e.g., with a restriction of PUCCH resources allocated) and performs sidelink transmission on allocated resources. A restriction of PUCCH resources allocated may mean that the gNB may decide whether to allocate PUCCH resources to the TX UE. If the gNB allocates PUCCH resources to the TX UE, the TX UE should select unicast or groupcast transmission and enable HARQ feedback on the SL. If the gNB doesn't allocate PUCCH resources to the TX UE, the TX UE may select broadcast, unicast, or groupcast transmission. Therefore, the presence of whether PUCCH resources are allocated may restrict a type of transmission used by the TX UE.

In a first step of the second embodiment, a gNB transmits DCI (e.g., including a sidelink grant) to a TX UE. The DCI allocates one or more resources (e.g., one or more PSSCH resources) for sidelink transmission of a TB from the TX UE, and the DCI allocates one or more resources (e.g., one or more PUCCH resources) for a SL HARQ report to be transmitted to the gNB from the TX UE over a Uu interface. The first PUCCH resource is for ACK/NACK feedback, and the remaining resources are for only ACK feedback. In certain embodiments, an invalid value in the DCI may be used to indicate that there no PUCCH resource allocation. For example, DCI may indicate that there are no PUCCH resources allocated using an invalid value such as '00000' in a field used to indicate PUCCH resources (e.g., frequency domain, time domain, and/or code domain resources). As another example, DCI may indicate that there are PUCCH resources allocated using a valid value in the field used to indicate PUCCH resources.

In a second step of the second embodiment, the TX UE selects the TB and performs a sidelink transmission on the allocated one or more resources (e.g., one or more PSSCH resources).

If the DCI allocates PUCCH resources for the TX UE to transmit the SL HARQ report to the gNB: 1) the TX UE may only select a TB to be transmitted using unicast or groupcast, and the TX UE should enable SL HARQ feedback to be transmitted from SL devices to the TX UE; and 2) the TX UE transmits SL HARQ feedback to the gNB on the allocated PUCCH resources as follows: a) for the first PUCCH resource: i) if the TX UE detects DCI successfully and the SL transmission on the first allocated resource is successful, the TX UE transmits ACK to the gNB on the first PUCCH resource; ii) if the TX UE detects DCI successfully and the SL transmission on the first allocated resource is unsuccessful, the TX UE transmits NACK to the gNB on the first PUCCH resource; and iii) if the TX UE detects DCI unsuccessfully, nothing will be transmitted on the first PUCCH resource; b) for the other PUCCH resources (e.g., other than the first PUCCH resource): i) if the corresponding SL transmission is successful, the TX UE transmits ACK to the gNB on the corresponding PUCCH resource; and ii) if the corresponding SL transmission is unsuccessful, nothing will be transmitted (e.g., no transmission) on the corresponding PUCCH resource.

If the DCI doesn't allocate PUCCH resources for the TX UE to transmit the SL HARQ report to the gNB: the TX UE may select the TB to be transmitted using broadcast, unicast, or groupcast, and for unicast or groupcast transmissions, the TX UE may decide if the SL HARQ feedback transmitted from SL devices to the TX UE is enabled or disabled.

In a third step of the second embodiment, if DCI allocates PUCCH resources for SL HARQ feedback to be transmitted from the TX UE to the gNB, the gNB detects the SL HARQ feedback on the allocated PUCCH resources. For all the PUCCH resources, if ACK is received by the gNB, the gNB may release the reallocate remaining resources (e.g., PSSCH resources, PUCCH resources) for other purposes. For the first PUCCH resource, if nothing is detected by the gNB, the gNB assumes that the TX UE has missed reception of the DCI and the gNB may re-allocate the remaining resources (e.g., PSSCH resources, PUCCH resources) besides the first ones for other purposes. If NACK is received by the gNB, the gNB may monitor the next PUCCH resource.

Figure 7:
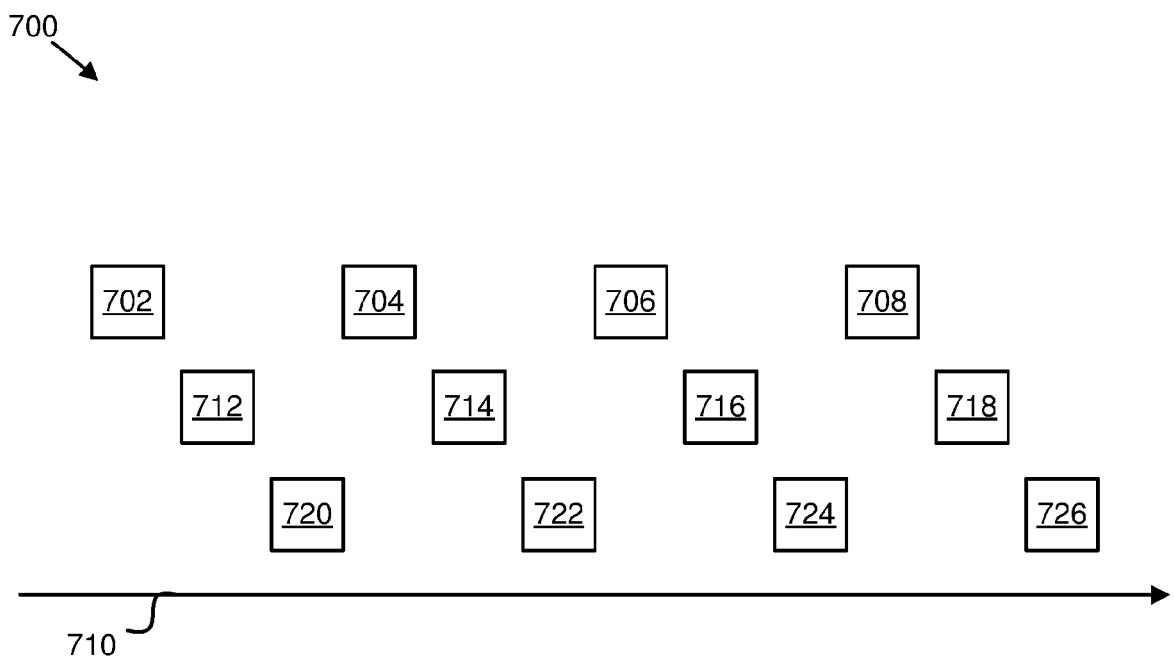
FIG. 7 is a schematic block diagram illustrating yet another embodiment of a TX UE's transmissions.
Figure 8:
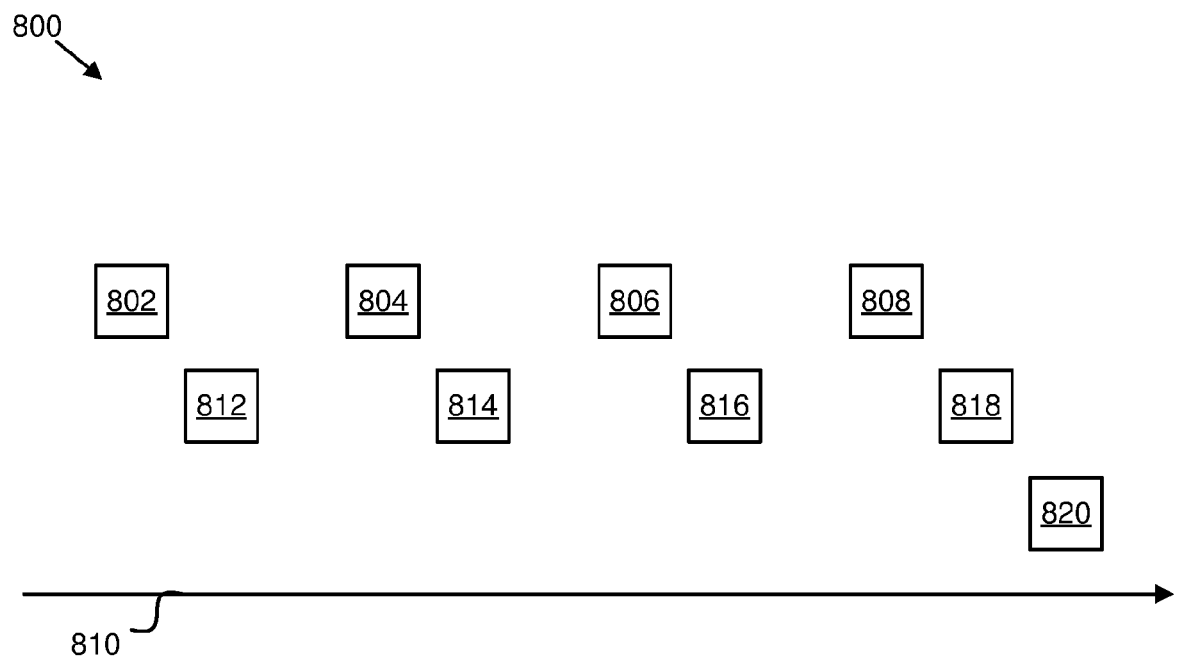
FIG. 8 is a schematic block diagram illustrating an additional embodiment of a TX UE's transmissions.
Figure 9:
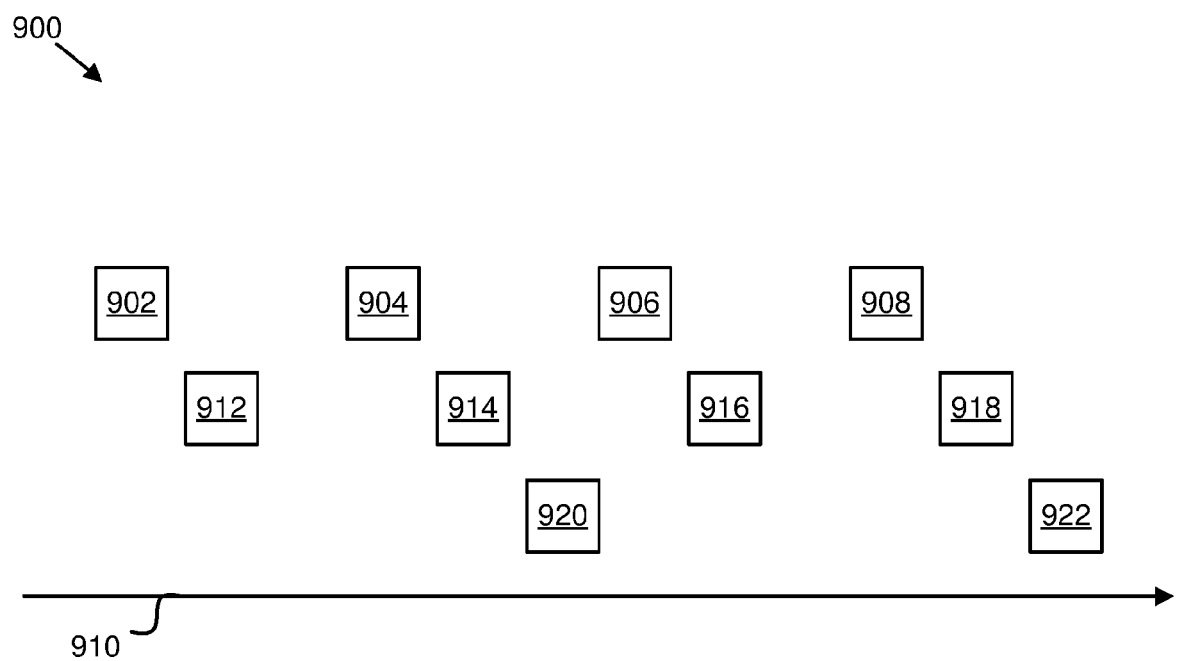
FIG. 9 is a schematic block diagram illustrating yet a further embodiment of a TX UE's transmissions.

FIGS. 7 through 9 illustrate examples of a TX UE's transmissions if the TX UE determines that there is SL HARQ feedback to be received from SL devices and DCI allocates PUCCH resources for transmission of SL HARQ feedback from the TX UE to the gNB.

FIG. 7 is a schematic block diagram illustrating yet another embodiment of a TX UE's transmissions 700. The TX UE's transmissions 700 include a first SL transmission 702 on a first PSSCH resource, a second SL transmission 704 on a second PSSCH resource, a third SL transmission 706 on a third PSSCH resource, and a fourth SL transmission 708 on a fourth PSSCH resource. All of the illustrated TX UE's transmissions 700 occur over a time period 710. The TX UE's transmissions 700 also include a first SL feedback transmission 712 received on a first PSFCH resource from SL devices, a second SL feedback transmission 714 received on a second PSFCH resource from SL devices, a third SL feedback transmission 716 received on a third PSFCH resource from SL devices, and a fourth SL feedback transmission 718 received on a fourth PSFCH resource from SL devices. The TX UE's transmissions 700 further include a first feedback transmission 720 on a first PUCCH resource, a second feedback transmission 722 on a second PUCCH resource, a third feedback transmission 724 on a third PUCCH resource, and a fourth feedback transmission 726 on a fourth PUCCH resource.

As described in the second embodiment, if SL HARQ feedback is enabled (e.g., the TX UE receives SL HARQ feedback from SL devices), in the embodiment illustrated in FIG. 7, the TX UE will transmit ACK/NACK in the first feedback transmission 720 (e.g., ACK if the corresponding SL transmission was successful, and NACK if the corresponding SL transmission was unsuccessful). In the second feedback transmission 722, the third feedback transmission 724, and the fourth feedback transmission 726, the TX UE will transmit ACK or no transmission (e.g., ACK if the corresponding SL transmission was successful, and no transmission if the corresponding SL transmission was unsuccessful).

FIG. 8 is a schematic block diagram illustrating an additional embodiment of a TX UE's transmissions 800. The TX UE's transmissions 800 include a first SL transmission 802 on a first PSSCH resource, a second SL transmission 804 on a second PSSCH resource, a third SL transmission 806 on a third PSSCH resource, and a fourth SL transmission 808 on a fourth PSSCH resource. All of the illustrated TX UE's transmissions 800 occur over a time period 810. The TX UE's transmissions 800 also include a first SL feedback transmission 812 received on a first PSFCH resource from SL devices, a second SL feedback transmission 814 received on a second PSFCH resource from SL devices, a third SL feedback transmission 816 received on a third PSFCH resource from SL devices, and a fourth SL feedback transmission 818 received on a fourth PSFCH resource from SL devices. The TX UE's transmissions 800 further include a first feedback transmission 820 on a first PUCCH resource.

As described in the second embodiment, if SL HARQ feedback is enabled (e.g., the TX UE receives SL HARQ feedback from SL devices), in the embodiment illustrated in FIG. 8, in the first feedback transmission 820, the TX UE will transmit ACK or no transmission (e.g., ACK if the corresponding SL transmissions were successful, and no transmission if the corresponding SL transmissions were unsuccessful).

FIG. 9 is a schematic block diagram illustrating yet a further embodiment of a TX UE's transmissions 900. The TX UE's transmissions 900 include a first SL transmission 902 on a first PSSCH resource, a second SL transmission 904 on a second PSSCH resource, a third SL transmission 906 on a third PSSCH resource, and a fourth SL transmission 908 on a fourth PSSCH resource. All of the illustrated TX UE's transmissions 900 occur over a time period 910. The TX UE's transmissions 900 also include a first SL feedback transmission 912 received on a first PSFCH resource from SL devices, a second SL feedback transmission 914 received on a second PSFCH resource from SL devices, a third SL feedback transmission 916 received on a third PSFCH resource from SL devices, and a fourth SL feedback transmission 918 received on a fourth PSFCH resource from SL devices. The TX UE's transmissions 900 further include a first feedback transmission 920 on a first PUCCH resource and a second feedback transmission 922 on a second PUCCH resource.

As described in the second embodiment, if SL HARQ feedback is enabled (e.g., the TX UE receives SL HARQ feedback from SL devices), in the embodiment illustrated in FIG. 9, the TX UE will transmit ACK/NACK in the first feedback transmission 920 (e.g., ACK if the corresponding SL transmissions were successful, and NACK if the corresponding SL transmissions were unsuccessful). In the second feedback transmission 922 the TX UE will transmit ACK or no transmission (e.g., ACK if the corresponding SL transmissions were successful, and no transmission if the corresponding SL transmissions were unsuccessful). As may be appreciated, the embodiments described herein may reduce overhead of resources by reallocated resources when they are no longer needed.

Figure 10:
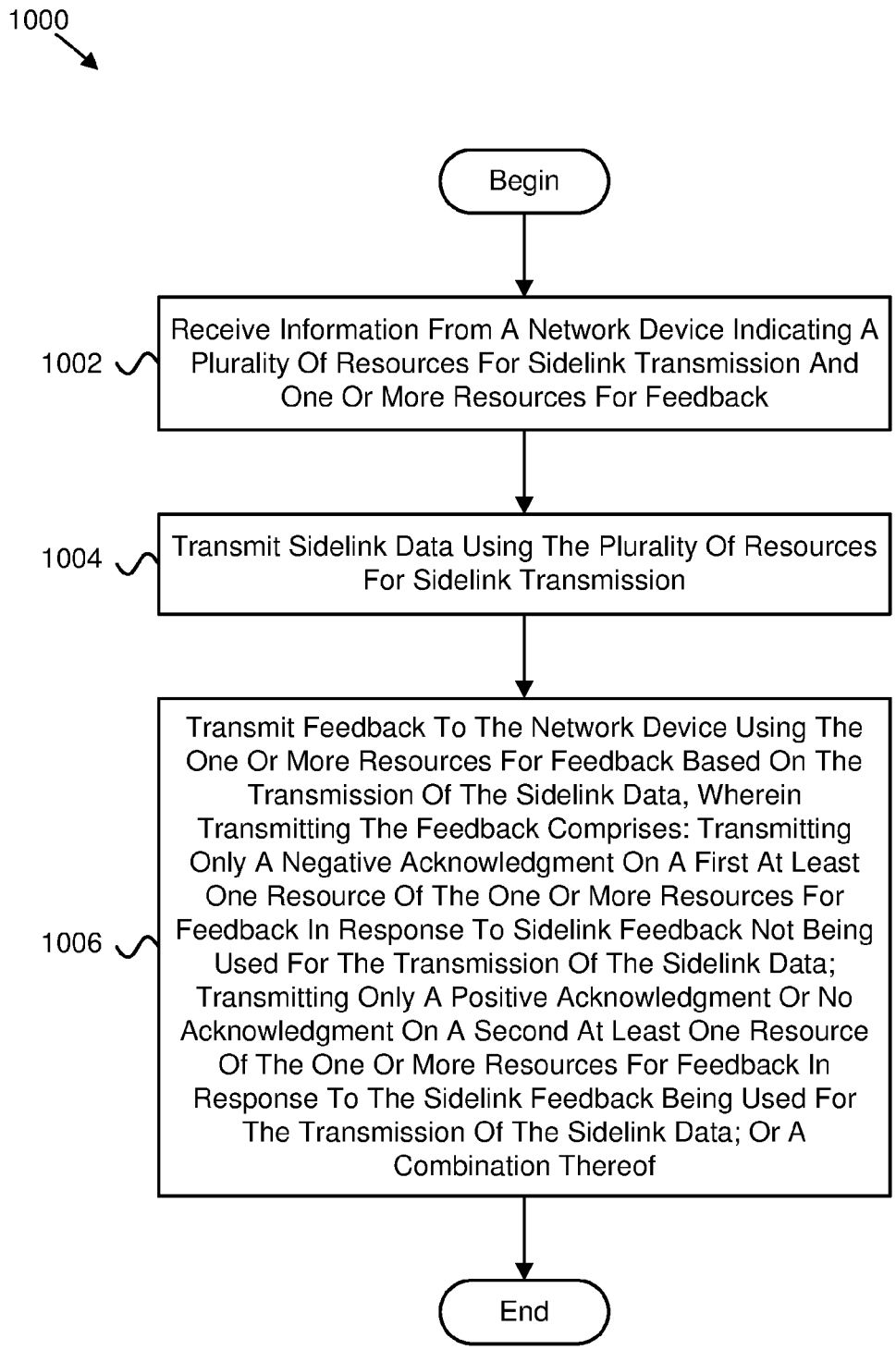
FIG. 10 is a schematic flow chart diagram illustrating one embodiment of a method for transmitting feedback for sidelink transmissions.

FIG. 10 is a schematic flow chart diagram illustrating one embodiment of a method 1000 for transmitting feedback for sidelink transmissions. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

The method 1000 may include receiving 1002 information from a network device indicating a plurality of resources for sidelink transmission and one or more resources for feedback. In certain embodiments, the method 1000 includes transmitting 1004 sidelink data using the plurality of resources for sidelink transmission. In various embodiments, the method 1000 includes transmitting 1006 feedback to the network device using the one or more resources for feedback based on the transmission of the sidelink data, wherein transmitting the feedback comprises: transmitting only a negative acknowledgment on a first at least one resource of the one or more resources for feedback in response to sidelink feedback not being used for the transmission of the sidelink data; transmitting only a positive acknowledgment or no acknowledgment on a second at least one resource of the one or more resources for feedback in response to the sidelink feedback being used for the transmission of the sidelink data; or a combination thereof.

In certain embodiments, in response to the sidelink feedback being used for the transmission of the sidelink data, transmitting the feedback comprises transmitting any of the positive acknowledgment, the negative acknowledgment, or the no acknowledgment on at most a single resource of the one or more resources for feedback. In some embodiments, the single resource is a first resource in time of the one or more resources for feedback. In various embodiments, the second at least one resource of the one or more resources comprises all resources of the one or more resources except the first resource in time.

In one embodiment, transmitting only the positive acknowledgment or the no acknowledgment on the second at least one resource of the one or more resources for feedback in response to the sidelink feedback being used for the transmission of the sidelink data comprises transmitting the positive acknowledgment in response to a successful transmission of the sidelink data and transmitting the no acknowledgment in response to an unsuccessful transmission of the sidelink data. In certain embodiments, in response to the sidelink feedback not being used for the transmission of the sidelink data, transmitting the feedback comprises transmitting the positive acknowledgment on at most a single resource of the one or more resources for feedback.

In some embodiments, the single resource is a last resource in time of the one or more resources for feedback. In various embodiments, the first at least one resource of the one or more resources comprises all resources of the one or more resources except the last resource in time.

Figure 11:
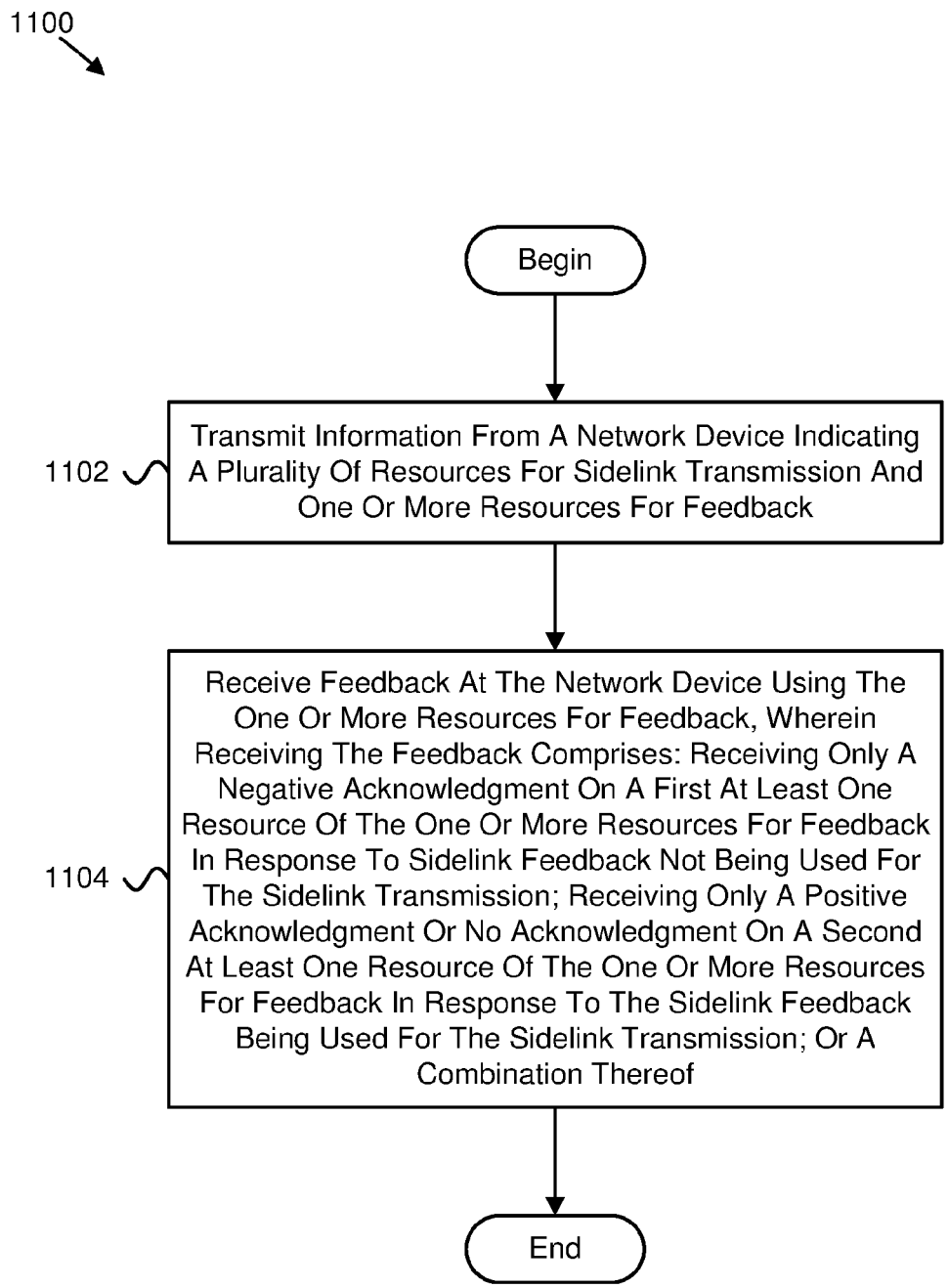
FIG. 11 is a schematic flow chart diagram illustrating one embodiment of a method for receiving feedback for sidelink transmissions.

FIG. 11 is a schematic flow chart diagram illustrating one embodiment of a method 1100 for receiving feedback for sidelink transmissions. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

The method 1100 may include transmitting 1102 information from a network device indicating a plurality of resources for sidelink transmission and one or more resources for feedback. In certain embodiments, the method 1100 includes receiving 1104 feedback at the network device using the one or more resources for feedback, wherein receiving the feedback comprises: receiving only a negative acknowledgment on a first at least one resource of the one or more resources for feedback in response to sidelink feedback not being used for the sidelink transmission; receiving only a positive acknowledgment or no acknowledgment on a second at least one resource of the one or more resources for feedback in response to the sidelink feedback being used for the sidelink transmission; or a combination thereof.

In certain embodiments, in response to the sidelink feedback being used for the sidelink transmission, receiving the feedback comprises receiving any of the positive acknowledgment, the negative acknowledgment, or the no acknowledgment on at most a single resource of the one or more resources for feedback. In some embodiments, the single resource is a first resource in time of the one or more resources for feedback.

In various embodiments, the second at least one resource of the one or more resources comprises all resources of the one or more resources except the first resource in time. In one embodiment, receiving only the positive acknowledgment or the no acknowledgment on the second at least one resource of the one or more resources for feedback in response to the sidelink feedback being used for the sidelink transmission comprises receiving the positive acknowledgment in response to a successful sidelink transmission and receiving the no acknowledgment in response to an unsuccessful sidelink transmission.

In certain embodiments, in response to the sidelink feedback not being used for the sidelink transmission, receiving the feedback comprises receiving the positive acknowledgment on at most a single resource of the one or more resources for feedback. In some embodiments, the single resource is a last resource in time of the one or more resources for feedback. In various embodiments, the first at least one resource of the one or more resources comprises all resources of the one or more resources except the last resource in time.

In one embodiment, a method comprises: receiving information from a network device indicating a plurality of resources for sidelink transmission and one or more resources for feedback; transmitting sidelink data using the plurality of resources for sidelink transmission; and transmitting feedback to the network device using the one or more resources for feedback based on the transmission of the sidelink data, wherein transmitting the feedback comprises: transmitting only a negative acknowledgment on a first at least one resource of the one or more resources for feedback in response to sidelink feedback not being used for the transmission of the sidelink data; transmitting only a positive acknowledgment or no acknowledgment on a second at least one resource of the one or more resources for feedback in response to the sidelink feedback being used for the transmission of the sidelink data; or a combination thereof.

In certain embodiments, in response to the sidelink feedback being used for the transmission of the sidelink data, transmitting the feedback comprises transmitting any of the positive acknowledgment, the negative acknowledgment, or the no acknowledgment on at most a single resource of the one or more resources for feedback.

In some embodiments, the single resource is a first resource in time of the one or more resources for feedback.

In various embodiments, the second at least one resource of the one or more resources comprises all resources of the one or more resources except the first resource in time.

In one embodiment, transmitting only the positive acknowledgment or the no acknowledgment on the second at least one resource of the one or more resources for feedback in response to the sidelink feedback being used for the transmission of the sidelink data comprises transmitting the positive acknowledgment in response to a successful transmission of the sidelink data and transmitting the no acknowledgment in response to an unsuccessful transmission of the sidelink data.

In certain embodiments, in response to the sidelink feedback not being used for the transmission of the sidelink data, transmitting the feedback comprises transmitting the positive acknowledgment on at most a single resource of the one or more resources for feedback.

In some embodiments, the single resource is a last resource in time of the one or more resources for feedback.

In various embodiments, the first at least one resource of the one or more resources comprises all resources of the one or more resources except the last resource in time.

In one embodiment, an apparatus comprises: a receiver that receives information from a network device indicating a plurality of resources for sidelink transmission and one or more resources for feedback; and a transmitter that: transmits sidelink data using the plurality of resources for sidelink transmission; and transmits feedback to the network device using the one or more resources for feedback based on the transmission of the sidelink data, wherein transmitting the feedback comprises: transmitting only a negative acknowledgment on a first at least one resource of the one or more resources for feedback in response to sidelink feedback not being used for the transmission of the sidelink data; transmitting only a positive acknowledgment or no acknowledgment on a second at least one resource of the one or more resources for feedback in response to the sidelink feedback being used for the transmission of the sidelink data; or a combination thereof.

In certain embodiments, in response to the sidelink feedback being used for the transmission of the sidelink data, the transmitter transmitting the feedback comprises the transmitter transmitting any of the positive acknowledgment, the negative acknowledgment, or the no acknowledgment on at most a single resource of the one or more resources for feedback.

In some embodiments, the single resource is a first resource in time of the one or more resources for feedback.

In various embodiments, the second at least one resource of the one or more resources comprises all resources of the one or more resources except the first resource in time.

In one embodiment, the transmitter transmitting only the positive acknowledgment or the no acknowledgment on the second at least one resource of the one or more resources for feedback in response to the sidelink feedback being used for the transmission of the sidelink data comprises the transmitter transmitting the positive acknowledgment in response to a successful transmission of the sidelink data and transmitting the no acknowledgment in response to an unsuccessful transmission of the sidelink data.

In certain embodiments, in response to the sidelink feedback not being used for the transmission of the sidelink data, the transmitter transmitting the feedback comprises the transmitter transmitting the positive acknowledgment on at most a single resource of the one or more resources for feedback.

In some embodiments, the single resource is a last resource in time of the one or more resources for feedback.

In various embodiments, the first at least one resource of the one or more resources comprises all resources of the one or more resources except the last resource in time.

In one embodiment, a method comprises: transmitting information from a network device indicating a plurality of resources for sidelink transmission and one or more resources for feedback; and receiving feedback at the network device using the one or more resources for feedback, wherein receiving the feedback comprises: receiving only a negative acknowledgment on a first at least one resource of the one or more resources for feedback in response to sidelink feedback not being used for the sidelink transmission; receiving only a positive acknowledgment or no acknowledgment on a second at least one resource of the one or more resources for feedback in response to the sidelink feedback being used for the sidelink transmission; or a combination thereof.

In certain embodiments, in response to the sidelink feedback being used for the sidelink transmission, receiving the feedback comprises receiving any of the positive acknowledgment, the negative acknowledgment, or the no acknowledgment on at most a single resource of the one or more resources for feedback.

In some embodiments, the single resource is a first resource in time of the one or more resources for feedback.

In various embodiments, the second at least one resource of the one or more resources comprises all resources of the one or more resources except the first resource in time.

In one embodiment, receiving only the positive acknowledgment or the no acknowledgment on the second at least one resource of the one or more resources for feedback in response to the sidelink feedback being used for the sidelink transmission comprises receiving the positive acknowledgment in response to a successful sidelink transmission and receiving the no acknowledgment in response to an unsuccessful sidelink transmission.

In certain embodiments, in response to the sidelink feedback not being used for the sidelink transmission, receiving the feedback comprises receiving the positive acknowledgment on at most a single resource of the one or more resources for feedback.

In some embodiments, the single resource is a last resource in time of the one or more resources for feedback.

In various embodiments, the first at least one resource of the one or more resources comprises all resources of the one or more resources except the last resource in time.

In one embodiment, an apparatus comprises: a transmitter that transmits information from the apparatus indicating a plurality of resources for sidelink transmission and one or more resources for feedback; and a receiver that receives feedback at the apparatus using the one or more resources for feedback, wherein receiving the feedback comprises: receiving only a negative acknowledgment on a first at least one resource of the one or more resources for feedback in response to sidelink feedback not being used for the sidelink transmission; receiving only a positive acknowledgment or no acknowledgment on a second at least one resource of the one or more resources for feedback in response to the sidelink feedback being used for the sidelink transmission; or a combination thereof.

In certain embodiments, in response to the sidelink feedback being used for the sidelink transmission, the receiver receiving the feedback comprises the receiver receiving any of the positive acknowledgment, the negative acknowledgment, or the no acknowledgment on at most a single resource of the one or more resources for feedback.

In some embodiments, the single resource is a first resource in time of the one or more resources for feedback.

In various embodiments, the second at least one resource of the one or more resources comprises all resources of the one or more resources except the first resource in time.

In one embodiment, the receiver receiving only the positive acknowledgment or the no acknowledgment on the second at least one resource of the one or more resources for feedback in response to the sidelink feedback being used for the sidelink transmission comprises the receiver receiving the positive acknowledgment in response to a successful sidelink transmission and receiving the no acknowledgment in response to an unsuccessful sidelink transmission.

In certain embodiments, in response to the sidelink feedback not being used for the sidelink transmission, the receiver receiving the feedback comprises the receiver receiving the positive acknowledgment on at most a single resource of the one or more resources for feedback.

In some embodiments, the single resource is a last resource in time of the one or more resources for feedback.

In various embodiments, the first at least one resource of the one or more resources comprises all resources of the one or more resources except the last resource in time.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
receiving information from a network device indicating a plurality of resources for sidelink transmission and one or more PUCCH resources for feedback;
transmitting sidelink data using the plurality of resources for sidelink transmission; and
transmitting feedback to the network device using the one or more PUCCH resources for feedback based on the transmission of the sidelink data, wherein transmitting the feedback comprises:
transmitting only a negative acknowledgment on a first at least one resource of the one or more PUCCH resources for feedback in response to sidelink feedback not being used for the transmission of the sidelink data; or
transmitting only a positive acknowledgment or no acknowledgment on a second at least one resource of the one or more PUCCH resources for feedback in response to the sidelink feedback being used for the transmission of the sidelink data.

2. The method of claim 1, wherein, in response to the sidelink feedback being used for the transmission of the sidelink data, transmitting the feedback comprises transmitting any of the positive acknowledgment, the negative acknowledgment, or the no acknowledgment on at most a single resource of the one or more PUCCH resources for feedback.

3. The method of claim 2, wherein the single resource is a first PUCCH resource in time of the one or more PUCCH resources for feedback.

4. The method of claim 3, wherein the second at least one resource of the one or more PUCCH resources comprises all resources of the one or more PUCCH resources except the first PUCCH resource in time.

5. A user equipment (UE), comprising:
at least one memory; and
at least one processor coupled with the at least one memory and configured to cause the UE to:
receive information from a network device indicating a plurality of resources for sidelink transmission and one or more PUCCH resources for feedback; and
transmit sidelink data using the plurality of resources for sidelink transmission; and
transmit feedback to the network device using the one or more PUCCH resources for feedback based on the transmission of the sidelink data, wherein transmitting the feedback comprises:
transmitting only a negative acknowledgment on a first at least one resource of the one or more PUCCH resources for feedback in response to sidelink feedback not being used for the transmission of the sidelink data; or
transmitting only a positive acknowledgment or no acknowledgment on a second at least one resource of the one or more PUCCH resources for feedback in response to the sidelink feedback being used for the transmission of the sidelink data.

6. The UE of claim 5, wherein, in response to the sidelink feedback being used for the transmission of the sidelink data, causing the UE to transmit the feedback comprises the causing the UE to transmit any of the positive acknowledgment, the negative acknowledgment, or the no acknowledgment on at most a single PUCCH resource of the one or more PUCCH resources for feedback.

7. The UE of claim 6, wherein the single PUCCH resource is a first PUCCH resource in time of the one or more PUCCH resources for feedback.

8. The UE of claim 7, wherein the second at least one PUCCH resource of the one or more PUCCH resources comprises all PUCCH resources of the one or more PUCCH resources except the first PUCCH resource in time.

9. The UE of claim 5, wherein causing the UE to transmit only the positive acknowledgment or the no acknowledgment on the second at least one resource of the one or more resources for feedback in response to the sidelink feedback being used for the transmission of the sidelink data comprises transmitting the positive acknowledgment in response to a successful transmission of the sidelink data and transmitting the no acknowledgment in response to an unsuccessful transmission of the sidelink data.

10. The UE of claim 5, wherein, in response to the sidelink feedback not being used for the transmission of the sidelink data, causing the UE to transmit the feedback comprises causing the transmitter to transmit the positive acknowledgment on at most a single PUCCH resource of the one or more PUCCH resources for feedback.

11. The UE of claim 10, wherein the single PUCCH resource is a last PUCCH resource in time of the one or more PUCCH resources for feedback.

12. The UE of claim 11, wherein the first at least one PUCCH resource of the one or more PUCCH resources comprises all PUCCH resources of the one or more PUCCH resources except the last PUCCH resource in time.

13. A base station, comprising:
at least one memory; and
at least one processor coupled with the at least one memory and configured to cause the base station to:
transmit information from the base station indicating a plurality of resources for sidelink transmission and one or more PUCCH resources for feedback; and
receive feedback at the base station using the one or more PUCCH resources for feedback, wherein receiving the feedback comprises:
receiving only a negative acknowledgment on a first at least one resource of the one or more PUCCH resources for feedback in response to sidelink feedback not being used for the sidelink transmission; or
receiving only a positive acknowledgment or no acknowledgment on a second at least one resource of the one or more PUCCH resources for feedback in response to the sidelink feedback being used for the sidelink transmission.

14. The base station of claim 13, wherein, in response to the sidelink feedback being used for the sidelink transmission, the causing the base station to receive the feedback comprises the receiving any of the positive acknowledgment, the negative acknowledgment, or the no acknowledgment on at most a single PUCCH resource of the one or more PUCCH resources for feedback.

15. The base station of claim 14, wherein the single PUCCH resource is a first PUCCH resource in time of the one or more PUCCH resources for feedback.

16. The base station of claim 15, wherein the second at least one PUCCH resource of the one or more PUCCH resources comprises all resources of the one or more PUCCH resources except the first PUCCH resource in time.

17. The base station of claim 13, wherein causing the base station to receive only the positive acknowledgment or the no acknowledgment on the second at least one PUCCH resource of the one or more PUCCH resources for feedback in response to the sidelink feedback being used for the sidelink transmission comprises the receiving the positive acknowledgment in response to a successful sidelink transmission and receiving the no acknowledgment in response to an unsuccessful sidelink transmission.

18. The base station of claim 13, wherein, in response to the sidelink feedback not being used for the sidelink transmission, causing the base station to receiver the feedback comprises receiving the positive acknowledgment on at most a single PUCCH resource of the one or more PUCCH resources for feedback.

19. The base station of claim 18, wherein the single PUCCH resource is a last PUCCH resource in time of the one or more PUCCH resources for feedback.

20. The base station of claim 19, wherein the first at least one PUCCH resource of the one or more PUCCH resources comprises all resources of the one or more PUCCH resources except the last PUCCH resource in time.

* * * * *